United States Patent
De Wille et al.

(10) Patent No.: US 6,430,673 B1
(45) Date of Patent: Aug. 6, 2002

(54) MOTOR VEHICLE CONTROL UNIT HAVING A PROCESSOR PROVIDING A FIRST AND SECOND CHIP SELECT FOR USE IN A FIRST AND SECOND OPERATING MODE RESPECTIVELY

(75) Inventors: Eberhard De Wille, Schmidmühlen; Klaus Lindner, Tegernheim; Ludwig Lutz, Sinzing, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/374,897

(22) Filed: Aug. 13, 1999

Related U.S. Application Data

(63) Continuation of application No. PCT/DE98/00362, filed on Feb. 9, 1998.

(30) Foreign Application Priority Data

Feb. 13, 1997 (DE) .......................................... 197 05 507

(51) Int. Cl.$^7$ .............................................. G06F 15/00
(52) U.S. Cl. ................................ 712/37; 712/43; 711/1
(58) Field of Search ............................ 711/167, 1, 111, 711/214; 712/40, 43, 37, 6; 710/10

(56) References Cited

U.S. PATENT DOCUMENTS

| | | | | |
|---|---|---|---|---|
| 5,448,744 A | * | 9/1995 | Eifert et al. .................... | 712/40 |
| 5,511,182 A | * | 4/1996 | Le et al. ....................... | 713/600 |
| 5,724,604 A | * | 3/1998 | Moyer .......................... | 712/43 |
| 5,740,404 A | * | 4/1998 | Baji ............................ | 711/167 |
| 5,802,541 A | * | 9/1998 | Reed ............................. | 711/1 |
| 5,813,041 A | * | 9/1998 | McIntyre et al. ............. | 711/167 |
| 5,987,635 A | * | 11/1999 | Kishi et al. .................. | 714/724 |

FOREIGN PATENT DOCUMENTS

| | | |
|---|---|---|
| DE | 195 00 453 A1 | 12/1995 |
| EP | 0 120 525 A2 | 10/1984 |

OTHER PUBLICATIONS

Japanese Patent Abstract No. 58082351 (Minoru), dated May 17, 1983.
Japanese Patent Abstract No. 04237346 (Hironori), dated Aug. 25, 1992.

* cited by examiner

*Primary Examiner*—Zarni Maung
*Assistant Examiner*—Wen-Tai Lin
(74) *Attorney, Agent, or Firm*—Laurence A. Greenberg; Werner H. Stemer; Ralph E. Locher

(57) ABSTRACT

A control unit that includes a processor having at least a first chip select output and a second chip select output. A signal provided by the first chip select output is activated during a normal operating mode of the control unit, and a signal provided by the second chip select output is activated during an application mode of the control unit. The control unit also includes a RAM memory having a chip select input for selecting the RAM memory and having a memory area for use as an application memory. A combination element electrically couples the signal provided by the first chip select output and the signal provided by the second chip select output to the chip select input of the RAM memory such that the signal provided by the first chip select output and the signal provided by the second chip select output do not have a perturbing effect on each other. The memory area for use as an application memory is available as the application memory when the signal provided by the second chip select output is activated during the application mode of the control unit. The new control unit enables the standard commercially available processor to be used to implement a specific application without requiring a specially designed processor and with a low hardware and software outlay and/or cost.

4 Claims, 2 Drawing Sheets

| | | |
|---|---|---|
| 1 | | Write Chip Select Enabled |
| 1 | C | Read Chip Select Enabled |
| 0 | | not used |
| 0 | | Control by the Ready signal not enabled |
| 0 | | not used |
| 1 | 4 | External Bus enabled |
| 0 | | Normal ALE signal |
| 0 | | not used |
| 0 | | BUS type 00 |
| 0 | 0 | BUS type 00 = 8 bit demultiplexed BUS |
| 0 | | Memory Tristate Time = 1 Waitstate |
| 0 | | Read / Write Delay activated |
| 1 | | Memory Cycle Time Control = 1 Waitstate |
| 1 | E | |
| 1 | | |
| 0 | | |

| | | |
|---|---|---|
| 1 | | Write Chip Select Enabled |
| 1 | C | Read Chip Select Enabled |
| 0 | | not used |
| 0 | | Control by the Ready signal not enabled |
| 0 | | not used |
| 1 | 4 | External Bus enabled |
| 0 | | Normal ALE signal |
| 0 | | not used |
| 0 | | BUS type 00 |
| 0 | 0 | BUS type 00 = 8 bit demultiplexed BUS |
| 0 | | Memory Tristate Time = 1 Waitstate |
| 0 | | Read / Write Delay activated |
| 1 | | Memory Cycle Time Control = 1 Waitstate |
| 1 | E | |
| 1 | | |
| 0 | | |

MOTOR VEHICLE CONTROL UNIT HAVING A PROCESSOR PROVIDING A FIRST AND SECOND CHIP SELECT FOR USE IN A FIRST AND SECOND OPERATING MODE RESPECTIVELY

CROSS REFERENCE TO RELATED APPLICATION

This application is a continuation of International Application PCT/DE98/00362, filed Feb. 9, 1998, which designated the United States.

BACKGROUND OF THE INVENTION

Field of the Invention

The present invention relates, in general, to control units, and in particular, to a special configuration of a standard commercially available control unit so that an application specific processor need not be designed. In order to perform control functions, for example in motor vehicles, use is increasingly made of processor-controlled control units that control an automatic transmission or, alternatively, any other type of device. For this purpose, particularly when the functional scope and parameter range are known, it is preferable to use a standard commercially available control unit with a microcontroller and a memory, especially an external RAM module and flash memory. This results in a cost-effective design.

Problems can arise in the course of the application, for example, the adaptation of a control unit, in particular for a control unit of a transmission. For example, if a transmission specialist desires to adapt constants and characteristic curves for a specific type of motor vehicle, standard commercially available control units are not suitably designed for this application. For this purpose, control units with specially designed processors or other components have been applied heretofore. As an alternative to this, standard commercially available control units can be equipped with an additional memory in order to be able to utilize them at any time, but this is associated with additional technical complexity, costs and the required hardware and software. In this case, this additional memory (RAM module) can be inserted, for application purposes, into the area to be applied. It is also possible to use special control units in which the flash memory is completely replaced by a battery-buffered RAM memory. With these measures, although the application of the control unit is possible, for example in order to change characteristic curves during a motor vehicle journey, it is nonetheless associated with a high outlay.

German Patent Application DE 195 00 453 A1 discloses a control unit with a processor that does not have any chip select outputs. A decoder is provided for module selection. The decoder selects the assigned module according to the address transmitted on the address bus. At the output of the decoder, three chip select lines are provided. One serves for ROM selection, the second is used for RAM selection and the third is used in an application. The decoder is programmed in such a way that in the event of a desired application, the decoder always puts both the chip select line for the RAM selection and the chip select line for the application at the same potential. In this case, the chip select line for the application is connected to an address input of the RAM and consequently has the effect that only the memory area above this address value is used during the application.

SUMMARY OF THE INVENTION

It is accordingly an object of the invention to provide a new control unit with a standard commercially available processor, that overcomes the above mentioned disadvantageous of the heretofore known devices of this type.

With the foregoing and other objects in view there is provided, in accordance with the invention, a control unit that includes a processor having at least a first chip select output and a second chip select output. A signal provided by the first chip select output is activated during a normal operating mode of the control unit, and a signal provided by the second chip select output is activated during an application mode of the control unit. The control unit also includes a RAM memory having a chip select input for selecting the RAM memory and having a memory area for use as an application memory. A combination element electrically couples the signal provided by the first chip select output and the signal provided by the second chip select output to the chip select input of the RAM memory such that the signal provided by the first chip select output and the signal provided by the second chip select output do not have a perturbing effect on each other. The memory area for use as an application memory is available as the application memory when the signal provided by the second chip select output is activated during the application mode of the control unit.

The new control unit enables the standard commercially available processor to be used to implement a specific application without requiring a specially designed processor and with a low hardware and software outlay and/or cost.

The control unit includes an external RAM module having a portion that can be used as application RAM. It is not necessary, therefore, to provide an additional RAM module. Since only a portion of the external RAM module is used as application RAM, the remaining portion of the external RAM module can be used for the customary purpose, for example for storing software variables. In this case, it is possible to define the portion used as application RAM in a freely positionable manner within the entire address range. Given appropriate structuring of the software, it is also possible to achieve a dual use of the application RAM. Software portions that are not used during the application or which can be deliberately dispensed with can use that portion of the external RAM module which is used as application RAM during normal operation (operating periods outside an application).

As discussed, the required hardware outlay is extremely low. The control unit merely requires a processor with an additional chip select line, an external RAM module, and a combination element for enabling the selection of the external RAM module with two chip select lines.

Consequently, the invention makes it possible to implement a special application with a control unit, for example for a transmission control, thereby making it possible to adapt constants and characteristic curves for a specific type of motor vehicle. This adaptation can be carried out while the motor vehicle is traveling, and the normal control functions of the control unit can also be carried out during the application phase.

In accordance with an added feature of the invention, the combination element is a logic element.

In accordance with an additional feature of the invention, the combination element is a logic OR element.

In accordance with a concomitant feature of the invention, the combination element is a logic AND element.

Other features which are considered as characteristic for the invention are set forth in the appended claims.

Although the invention is illustrated and described herein as embodied in a control unit, in particular for use in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figures 1, 3:
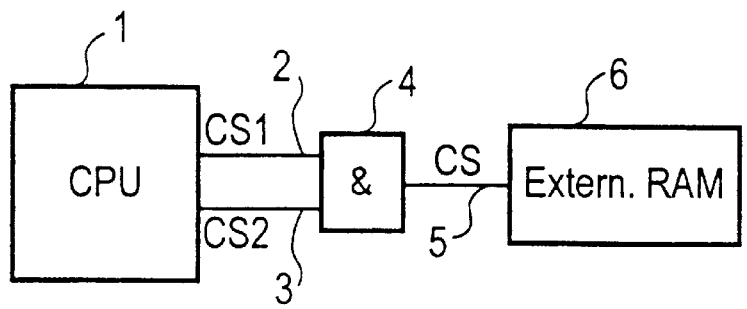
FIG. 1 shows a block diagram of the basic structure of an exemplary embodiment of the invention.
FIG. 3 shows an example of the content of a bus controller register and the command assignment thereof.

Referring now to the drawings in detail and first, particularly to FIG. 1 thereof, there is seen a CPU 1, for example a processor or a microcontroller, that has at least two chip select outputs CS1 and CS2, at which corresponding chip select output signals are generated for the selection of desired modules. Two chip select lines 2 and 3 lead from the two chip select outputs CS1 and CS2 of the CPU 1 and are combined with one another using a combination element 4. The output of the combination element 4 is connected to the chip select input CS of an external RAM module 6 using a single chip select line 5. The external RAM module 6 preferably has at least 8 kilobytes of memory space.

The CPU 1 preferably includes one of the processor types 80C166 or 80C167 manufactured by Siemens AG. However, it is also possible to use other processors, such as successor models for instance, which have the same bus architecture and control modes for controlling the external bus. The combination element 4 performs a logic OR operation or combination, with the result that the same, external RAM module 6 is always selected irrespective of whether the chip select line 2 or the chip select line 3 is activated for selection of the RAM module 6. Because the chip select lines 2 and 3 that are connected to the 80C166 or the 80C167 processor are held at high level if module selection is not desired, an AND logic element is used as the logic combination element 4. When module selection is not desired, the chip select lines 2 and 3 are at a logic high level, and the AND logic element outputs an output signal having a high level. This output signal is fed to the chip select input CS of the e external RAM module 6 which interprets the output signal provided by the AND logic element as indicating a lack of selection. When one of the chip select lines 2 or 3 is activated by going to a logic low level, the output signal of the AND logic element will change to low level, which provides the select command for selecting the RAM module 6.

In the case of a processor having chip select lines that change from a low to a high level for module selection, an OR logic element is preferably used as the combination element 4. In any event the combination element 4 effects the combination of two separate chip select lines 2 and 3, proceeding from the CPU 1, for joint wiring to the chip select input CS of the RAM module 6.

The programming is preferably designed in such a way that during the normal, application-free mode of the control unit containing the components 1 to 6 and further customary components (not illustrated), a portion of the external RAM module 6, preferably half, in particular the lower 4 kilobytes, are either not used at all or are used merely for data that are not accessed during the application mode. During the application mode, this portion of the external RAM module 6 is occupied by a block of, in particular 4 kilobytes which is designed for the application. For this four-kilobyte block, it is necessary to provide a base position (outside the RAM module 6) for the application-free mode. The base position is contained, in particular, in a flash memory (not illustrated). If the control unit is not in the application mode, this four-kilobyte RAM block is stored in its base position. Consequently, no access to this base position is provided during the normal mode, since the information contained therein is required only for the application mode.

At the beginning of an application, the contents of this memory region is loaded from the flash memory into the external RAM module 6, preferably into the lower half of the latter. When the application has ended, this information block that may have been adapted during the application mode is stored back in the flash memory. It is preferable, therefore, for there to be a free flash block which serves as a spooler block for the flash programming at the end of the application, and which is large enough to store the largest flash block that has been used during the application. As an alternative, the flash block that has been subjected to the application can be copied into the application system and reprogramming of the flash block can be performed by erasing the flash block and then rewriting the external data back from the application system to the erased flash block.

Further details of the exemplary embodiment are explained below with reference to a tested version.

Figure 2:
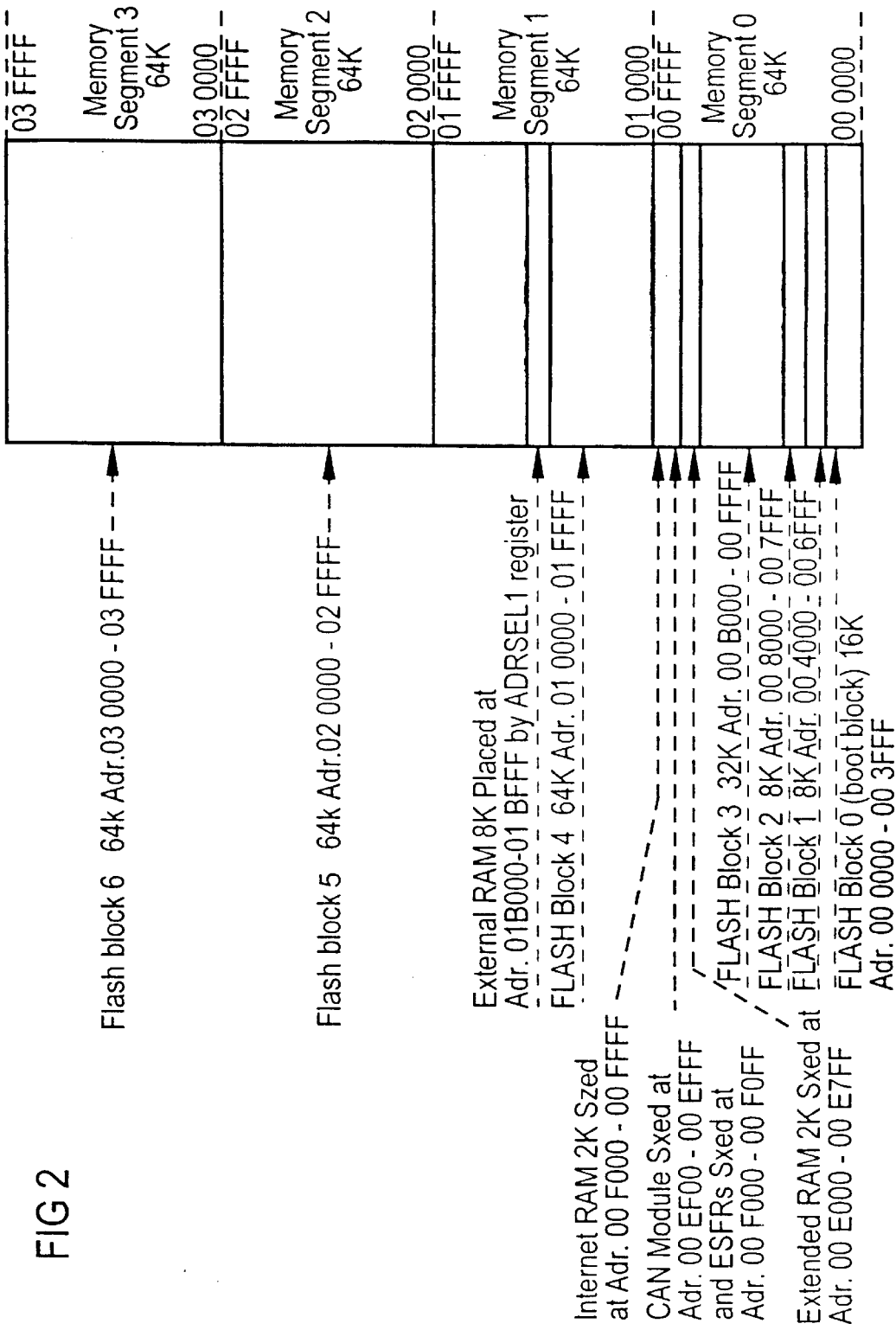
FIG. 2 shows an example of the memory address range provided in the exemplary embodiments.

FIG. 2 illustrates the address scope of the memory address range used. The memory area comprises four memory segments 0 to 3 of 64 kilobytes each. The memory segments are located at the following addresses which are specified in the hexadecimal system—00 0000 to 00 FFFF; 01 0000 to 01 FFFF; 02 0000 to 02 FFFF and 03 0000 to 03 FFFF. The memory segment 0 contains four flash blocks 0 to 3, of which the flash block 0 forms the boot block with 16 kilobytes, flash blocks 1 and 2 have a size of 8 kilobytes, and flash block 3 has a size of 32 kilobytes. An internal RAM with 2 kilobytes and an external RAM with 2 kilobytes are also provided in the address field of memory segment 0. A flash block 4, 5 and 6 respectively correspond to the memory segments 1 to 3. The addresses of the external RAM module 6 with 8 kilobytes are also contained within the memory segment 1. In the case of the tested version, the external RAM was arranged at the addresses 0x01 8000 to 0x01 9FFF. This RAM module is selected during the normal mode using the chip select line 2 by a corresponding setting of the registers BUSCON1 and ADDRSEL1 (not illustrated). In addition, as explained, the RAM module 6 may also be selected using the further chip select line 3.

Using a routine that is called and processed when the control unit is switched on or using another condition occurring during operation, the registers (not shown) ADDRSEL1 (for the address selection) and BUSCON1 (for the bus control) are loaded in such a way that the entire memory area, encompassing 8 kilobytes, of the RAM module 6 is selected using the chip select line 1. The registers can be used completely by the normal software of the control unit. A register (likewise not shown) BUSCON3 (for the chip select line 3) is not yet loaded in this case, but rather is used only at a later point in time. As an example, the following commands and specifications can be processed during this routine which is called and processed when the control unit is switched on or on account of another operating condition:

```
MOV    SYSCON, #0084H
MOV    BUSCON1, #0C40EH
MOV    ADDRSEL1, #00181H
MOV    BUSCON2, #0848EH
MOV    ADDRSEL2, #00406H.
```

In this case, among other things, the register BUSCON1 is set to the value OC40EH (hexadecimal system). The meaning of this setting to C40E is illustrated in FIG. 3 in the form of a table. In this case, the first column gives the individual register values in the binary system, while the hexadecimal values (C, 4, 0 and E) are given in the next column. The right-hand column lists the respectively assigned control operations that are specified by the register values given in each case. Since the table according to FIG. 3 is self-explanatory, a more detailed description is not necessary. The illustration in FIG. 3 is one example. The specification for the external RAM module 6 may also differ depending on the hardware configuration of the control unit.

The software may be compiled and linked in such a way that the addresses 0x01 8000 to 0x01 8FFF are not used during the normal application-free mode of the control unit. One example of the linker options may be as follows:

'XCAL1' (15000h-17fffh)\
'CUSTACK' (19000h-197ffh)\
'SIERAM', 'XRAM', 'YRAM' (19800h-19fffh)\
'XCAL2' (1a000h-1fffh)\

It is evident from the above example that the entire address range from 0x01 8000 to 0x01 8FFF has been skipped. If necessary, this range can also be used during the normal control-unit mode outside an application mode for a memory class containing variables that are not accessed during the application. This depends on the control unit modes and the software structure.

A trigger condition may be provided during the normal mode of the software. The trigger condition may correspond to a command entered by a person, e.g. a test engineer, and upon this occurrence, the construction of a desired application page begins. When the trigger condition occurs, the following steps may be executed, by way of example:

1.) The registers (not shown) BUSCON3 and ADDRSEL3 (second chip select line 3 to the RAM module 6) are initially set to 0x0000. This enables access to the lower 4K block of the external RAM module 6 only using the chip select line 2 (CS1).

2.) The desired application page encompassing 4 kilobytes is copied from the flash memory to the lower 4K block of the RAM module 6. In this example, only a four-kilobyte page is copied. However, if a plurality of blocks each of four kilobytes are required by the system and they are to be accessed by the application system, it is also possible to provide an address table containing all of the blocks of four kilobytes.

3.) The registers BUSCON3 and ADDRSEL3 are now loaded in such a way that the application page previously copied into the RAM module 6 is covered, with the result that a read and write access to this 4K page can be achieved. For this purpose, by way of example, the commands MOV BUSCON3, #0C40EH and MOV ADDRSEL3, #00120H are carried out.

If the application is to be ended, an algorithm for reprogramming the flash memory is initiated at the conclusion of the application, or the results are copied in the application system for subsequent flash reprogramming.

The invention consequently enables a standard commercially available control unit having for example an 80C166 or 80C167 CPU, a flash memory and an external RAM memory to be utilized, for example, adapted to a type of motor vehicle. In this case, part of the external RAM memory is selected by the signal provided by the additional chip select line 3, which is combined with the signal provided by the normal chip select line 2. The result is that the RAM memory can also be used as an application RAM memory. The flash region of the control unit memory is consequently covered, for the application tasks, and for changes and/or corrections by a RAM region which can then be read and used by the program.

We claim:

1. A control unit, comprising:

a processor having at least a first chip select output and a second chip select output, a signal provided by said first chip select output being activated during a normal operating mode of the control unit, a signal provided by said second chip select output being activated during an application mode of the control unit;

a RAM memory having only one chip select input for selecting said RAM memory and having a memory area for use as an application memory; and a combination element electrically coupling said signal provided by said first chip select output and said signal provided by said second chip select output to said chip select input of said RAM memory;

said memory area for use as said application memory being available as said application memory when said signal provided by said second chip select output is activated during said application mode of the control unit.

2. The control unit according to claim 1, wherein said combination element is a logic element.

3. The control unit according to claim 1, wherein said combination element is a logic OR element.

4. The control unit according to claim 1, wherein said combination element is a logic AND element.

* * * * *